United States Patent
DiFrancesco et al.

(10) Patent No.: US 10,731,496 B2
(45) Date of Patent: Aug. 4, 2020

(54) BEARING-SUPPORTED SEAL

(71) Applicant: United Technologies Corporation, Farmington, CT (US)

(72) Inventors: Michael L. DiFrancesco, Waterbury, CT (US); Conway Chuong, Manchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 158 days.

(21) Appl. No.: 15/873,234

(22) Filed: Jan. 17, 2018

(65) Prior Publication Data

US 2019/0218927 A1  Jul. 18, 2019

(51) Int. Cl.

| | |
|---|---|
| *F01D 11/00* | (2006.01) |
| *F01D 11/02* | (2006.01) |
| *F16C 19/36* | (2006.01) |
| *F04D 29/08* | (2006.01) |
| *F16J 15/44* | (2006.01) |
| *F04D 29/059* | (2006.01) |
| *F16C 33/72* | (2006.01) |

(52) U.S. Cl.
CPC .......... *F01D 11/025* (2013.01); *F01D 11/001* (2013.01); *F04D 29/059* (2013.01); *F04D 29/083* (2013.01); *F16C 19/36* (2013.01); *F16C 33/72* (2013.01); *F16J 15/441* (2013.01); *F16J 15/442* (2013.01); *F05D 2220/32* (2013.01); *F05D 2240/54* (2013.01); *F16C 2360/23* (2013.01)

(58) Field of Classification Search
CPC .......... F16J 15/442; F16J 15/441; F01D 5/02; F01D 11/025; F01D 11/12; F05B 2240/57
See application file for complete search history.

(56) References Cited

U.S. PATENT DOCUMENTS

| | | | |
|---|---|---|---|
| 4,017,088 A * | 4/1977 | Lerjen | F16J 15/441 277/416 |
| 4,175,755 A | 11/1979 | Geary | |
| 6,338,490 B1 | 1/2002 | Bainachi | |
| 7,410,173 B2 * | 8/2008 | Justak | F01D 11/00 277/355 |
| 7,896,352 B2 * | 3/2011 | Justak | F16J 15/442 277/411 |

(Continued)

FOREIGN PATENT DOCUMENTS

| | | |
|---|---|---|
| DE | 10209009 | 1/2003 |
| EP | 3239471 A1 | 1/2017 |

OTHER PUBLICATIONS

European Search Report for European Patent Application No. 19152101.2, completed Jun. 18, 2019.

*Primary Examiner* — Eugene G Byrd
(74) *Attorney, Agent, or Firm* — Carlson, Gaskey & Olds, P.C.

(57) ABSTRACT

A seal according to the present disclosure includes a plate, and a floating shoe supported with respect to the plate in a first direction. The floating shoe has a sealing feature extending in a second direction perpendicular to the first direction. At least one bearing is between the plate and the floating shoe. The bearing is configured to facilitate movement of the floating shoe with respect to the plate in the second direction.

A gas turbine engine including the seal and a method of sealing a rotating component with respect to a stationary component are also disclosed.

17 Claims, 3 Drawing Sheets

(56) References Cited

U.S. PATENT DOCUMENTS

| | | | | |
|---|---|---|---|---|
| 8,002,285 B2* | 8/2011 | Justak | ..................... | F01D 11/02 |
| | | | | 277/412 |
| 8,172,232 B2* | 5/2012 | Justak | ................... | F16J 15/442 |
| | | | | 277/411 |
| 8,641,045 B2* | 2/2014 | Justak | ................... | F16J 15/442 |
| | | | | 277/412 |
| 8,919,781 B2* | 12/2014 | Justak | .................. | F01D 11/025 |
| | | | | 277/411 |
| 9,045,994 B2* | 6/2015 | Bidkar | ................... | F01D 11/02 |
| 9,115,810 B2* | 8/2015 | Bidkar | ................... | F16J 15/447 |
| 9,587,746 B2* | 3/2017 | Bidkar | ................. | F01D 11/025 |
| 9,611,749 B2 | 4/2017 | Thatte et al. | | |
| 10,184,347 B1* | 1/2019 | D'Ambruoso | ........ | F01D 11/003 |
| 2003/0080513 A1* | 5/2003 | Kirby, III | ............... | F16J 15/441 |
| | | | | 277/416 |
| 2004/0094901 A1 | 5/2004 | Gittler | | |
| 2013/0075975 A1* | 3/2013 | Hilaris | ............... | F04C 15/0003 |
| | | | | 277/350 |
| 2013/0285331 A1* | 10/2013 | Kostka | ................ | F01D 11/003 |
| | | | | 277/411 |
| 2014/0008871 A1* | 1/2014 | Bidkar | .................. | F16J 15/447 |
| | | | | 277/303 |
| 2014/0119912 A1 | 5/2014 | Bidkar et al. | | |
| 2015/0322816 A1* | 11/2015 | Schmitz | .................... | F01D 1/04 |
| | | | | 60/796 |
| 2016/0130963 A1* | 5/2016 | Wilson | ................. | F01D 11/001 |
| | | | | 60/805 |
| 2017/0211406 A1* | 7/2017 | Peters | ...................... | F03B 3/12 |
| 2018/0058240 A1* | 3/2018 | Chuong | .................... | F01D 5/02 |

\* cited by examiner

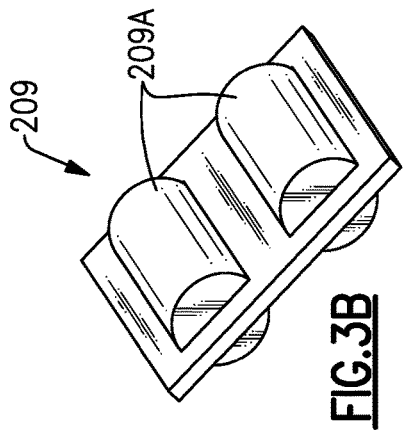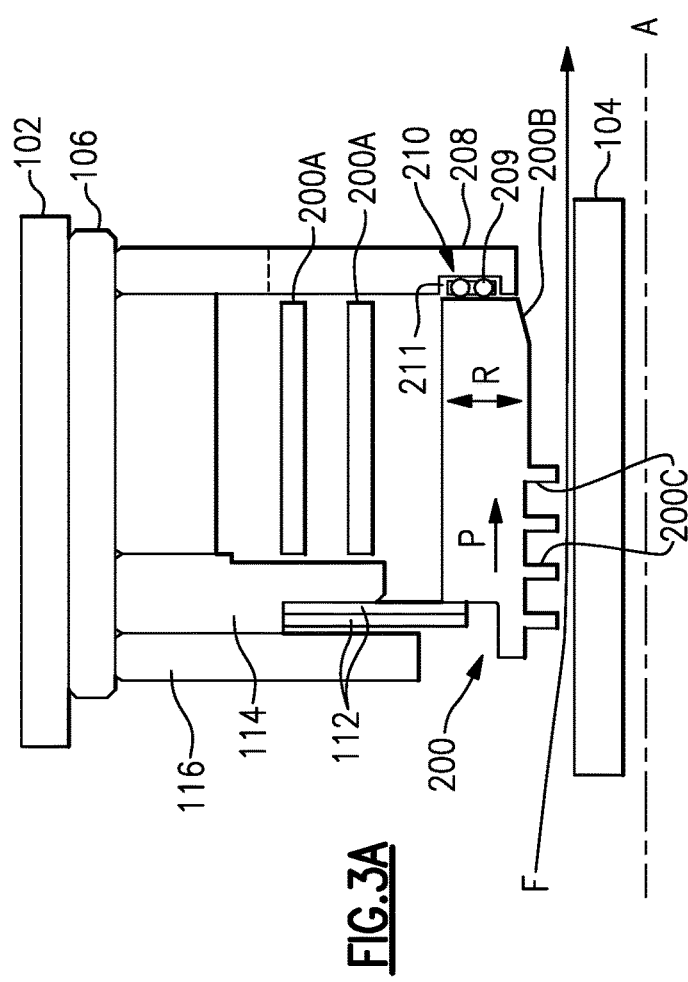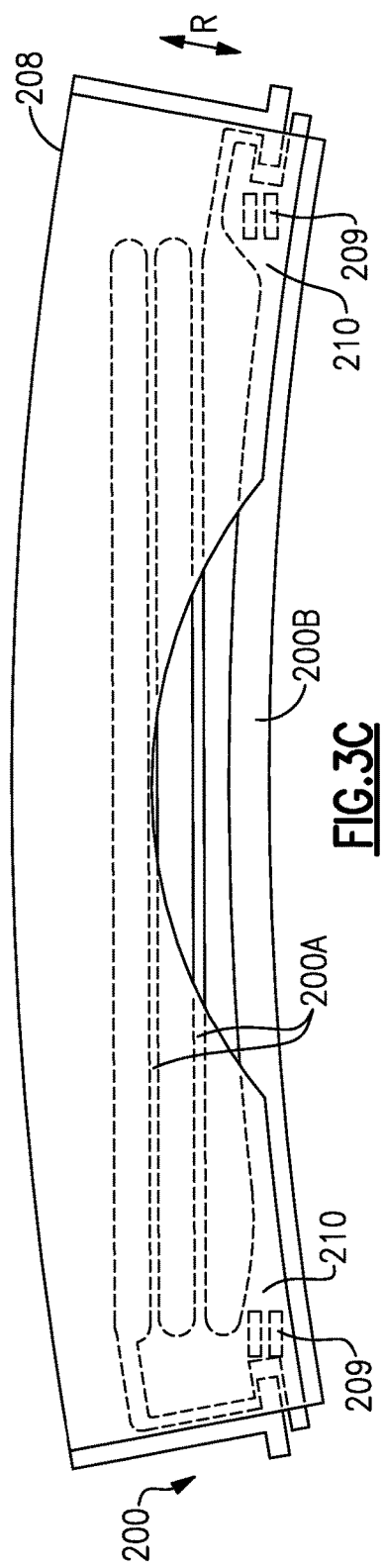

BEARING-SUPPORTED SEAL

STATEMENT REGARDING FEDERALLY SPONSORED RESEARCH OR DEVELOPMENT

This invention was made with government support under contract number FA8650-09-D-2923-0021 awarded by the United States Air Force. The government has certain rights in the invention.

BACKGROUND

Gas turbine engines have various sealing requirements. For example, rotating components are often sealed with respect to stationary components. More particularly, a turbine in a gas turbine engine can have a stationary structure and a rotating structure, with a seal in between.

Adaptive seals can be used in areas that are subject to varying fluid flow and/or movement of rotating or stationary structures during engine operations. Adaptive seals are dynamic in that they can provide sealing despite these changes in fluid flow and/or movement of structures. In particular, hydrostatic seals are a type of adaptive seal that can adapt to changes in fluid pressure.

Adaptive seals can include one or more components that move or float with respect to other components to provide the adaptive functionality. Such movement or floating can be subject to friction between moving/floating components and stationary components. Friction reduces the effectiveness of the seal by reducing the ability of floating/moving components to move. Friction also causes wear on seal components.

SUMMARY

A seal according to an example of the present disclosure includes a plate and a floating shoe supported with respect to the plate in a first direction. The floating shoe has a sealing feature that extends in a second direction perpendicular to the first direction. There is at least one bearing between the plate and the floating shoe, and the bearing is configured to facilitate movement of the floating shoe with respect to the plate in the second direction.

In a further embodiment according to any of the foregoing embodiments, the seal includes at least one beam configured to maintain movement of the floating shoe substantially in the second direction.

In a further embodiment according to any of the foregoing embodiments, at least one beam comprises two beams.

In a further embodiment according to any of the foregoing embodiments, at least one bearing is a roller bearing.

In a further embodiment according to any of the foregoing embodiments, at least one bearing is in at least one pocket of the plate.

In a further embodiment according to any of the foregoing embodiments, at least one bearing is in at least one pocket of the floating shoe.

In a further embodiment according to any of the foregoing embodiments, the sealing feature includes one or more sealing teeth.

A gas turbine engine according to an example of the present disclosure includes a first structure, a second structure, and a seal arranged between the first and second structures. The seal includes a plate and a floating shoe supported with respect to the plate. The floating shoe has a sealing feature that extends toward one of the first structure and the second structure. There is at least one bearing between the plate and the shoe, and the bearing is configured to facilitate movement of the floating shoe with respect to the plate.

In a further embodiment according to any of the foregoing embodiments, the plate is on a low-pressure side of the seal.

In a further embodiment according to any of the foregoing embodiments, the shoe floats in a radial direction with respect to an engine axis.

In a further embodiment according to any of the foregoing embodiments, the gas turbine engine includes at least one beam, and at least one beam is configured to maintain movement of the floating shoe substantially in the radial direction.

In a further embodiment according to any of the foregoing embodiments, at least one bearing is a roller bearing.

In a further embodiment according to any of the foregoing embodiments, at least one bearing is in at least one pocket in one of the plates and the floating shoe, and at least one pocket is configured to maintain an axial position of the at least one bearing with respect to an engine axis.

In a further embodiment according to any of the foregoing embodiments, fluid is passed between the first structure and the second structure has a higher pressure on a first side of the seal than on a second side of the seal.

In a further embodiment according to any of the foregoing embodiments, a pressure gradient of the fluid causes the shoe to move radially with respect to an engine axis to an equilibrium position.

In a further embodiment according to any of the foregoing embodiments, the first structure is a stationary structure and the second structure is a rotating structure, and the sealing feature extends towards the rotating structure.

In a further embodiment according to any of the foregoing embodiments, the first and second structures are in one of a turbine and a compressor of the gas turbine engine.

A method of sealing a stationary structure with respect to a rotating structure according to an example of the present disclosure includes supporting a floating shoe against a plate in a first direction. The floating shoe is movable with respect to the plate in a second direction perpendicular to the first direction via a bearing between the floating shoe and the plate.

In a further embodiment according to any of the foregoing embodiments, the floating shoe is movable in response to a pressure gradient of a fluid in the seal.

In a further embodiment according to any of the foregoing embodiments, A method of sealing a stationary structure with respect to a rotating structure includes maintaining a position of the floating shoe with respect to the plate in the first direction via at least one beam.

BRIEF DESCRIPTION OF THE DRAWINGS

FIG. 3A schematically illustrates a seal according to the present disclosure.

FIG. 3B schematically illustrates a bearing of the seal of FIG. 3A.

FIG. 3C schematically illustrates a side view of the prior art seal of FIG. 3A.

DETAILED DESCRIPTION

Figure 1:
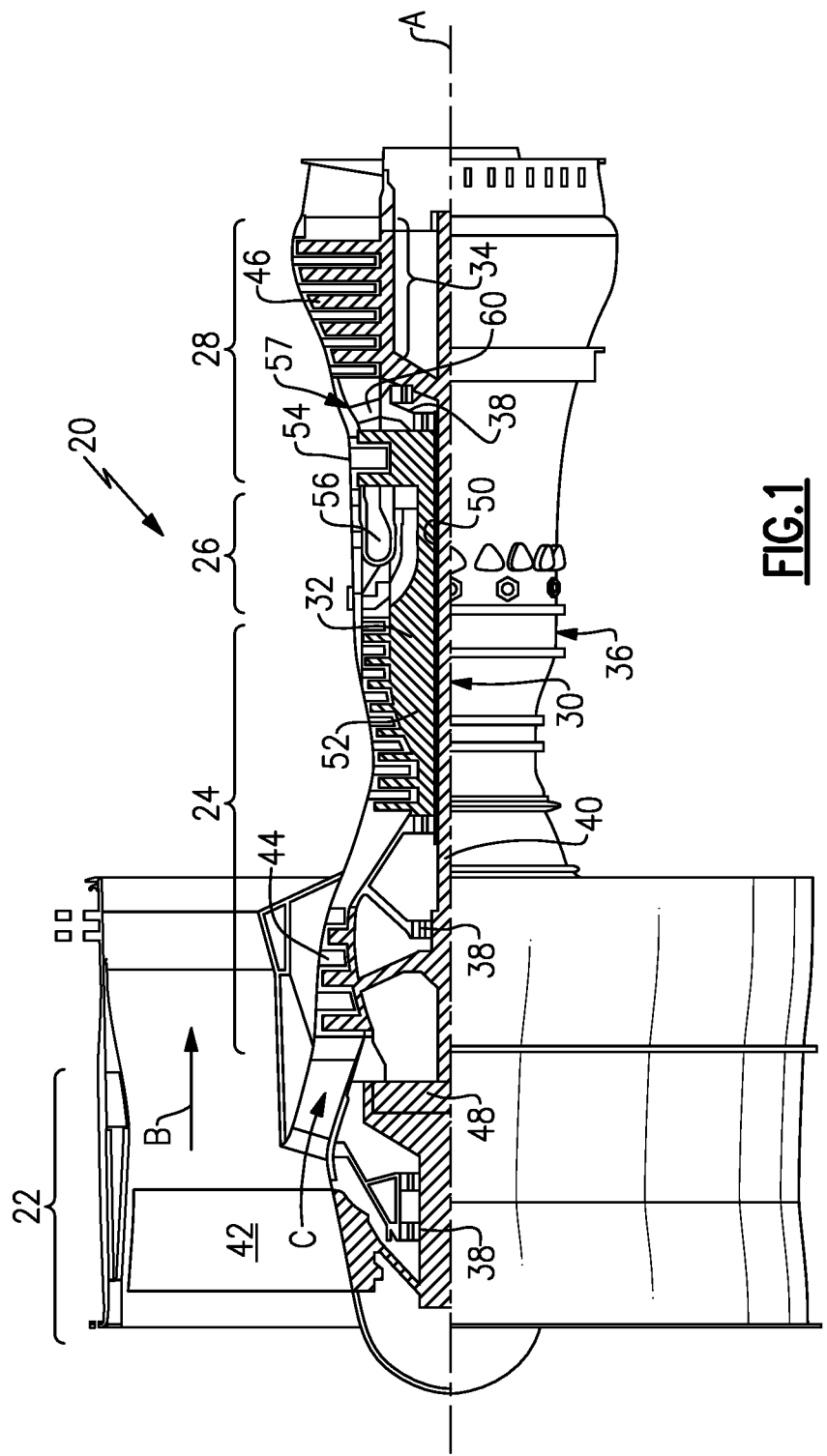
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis X which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and geared architecture 48 may be varied. For example, geared architecture 48 may be located aft of combustor section 26 or even aft of turbine section 28, and fan section 22 may be positioned forward or aft of the location of geared architecture 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 meters/second).

Figure 2A:
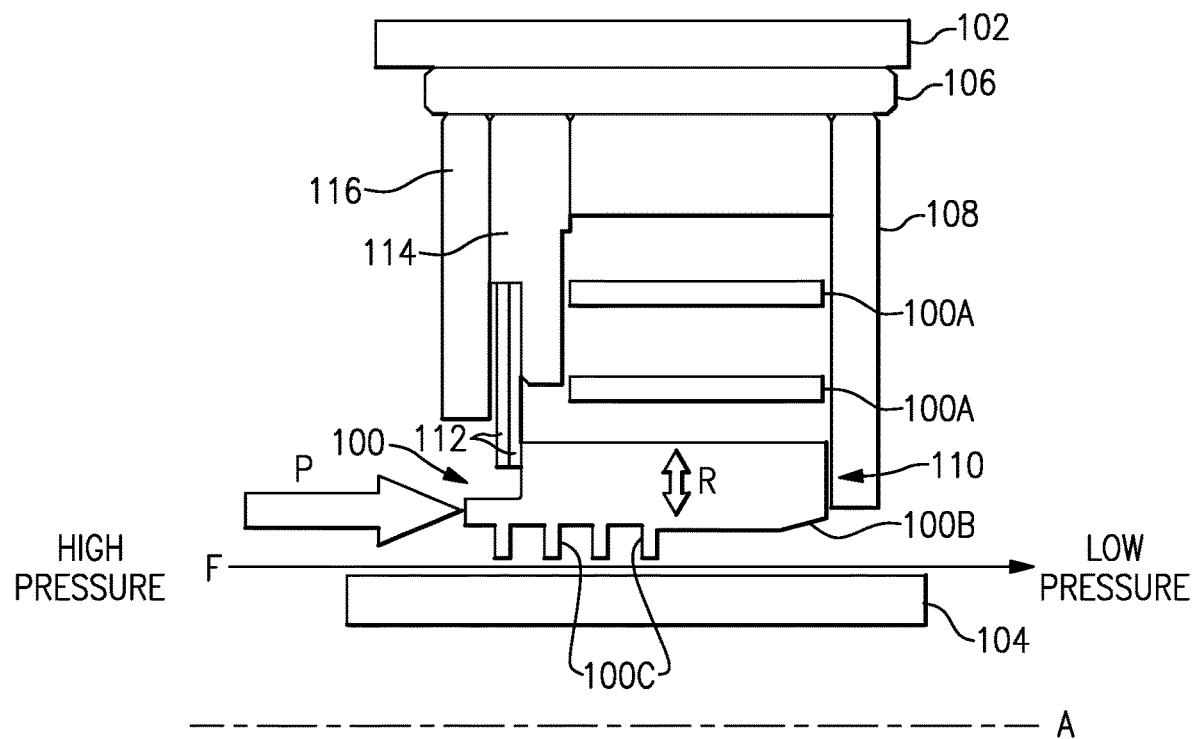
FIG. 2A schematically illustrates a prior art seal.
Figure 2B:
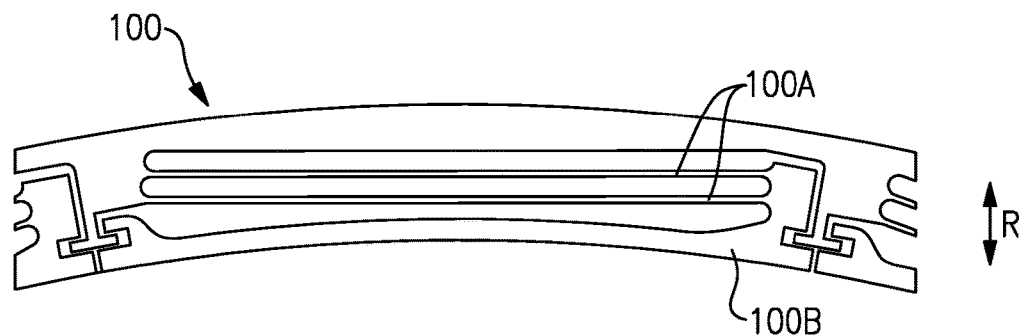
FIG. 2B schematically illustrates a side view of the prior art seal of FIG. 2A.

Turning to FIGS. 2A-B, a prior art seal 100 is schematically shown. The seal 100 seals a gap between a first structure 102 and a second structure 104. In one example, the first structure 102 is a static structure, and the second structure 104 is a rotating structure which rotates with respect to the engine axis A. A seal carrier 106 is between the static structure 102 and the seal 100 and supports the seal 100. As airflow F flows between the static structure 102 and the rotating structure 104, it loses pressure. Accordingly, airflow F has a relatively higher pressure upstream from the seal 100 than it does downstream from the seal 100.

In one example the static and rotating structures 102, 104 are of a turbine, such as the high pressure turbine 54 or low pressure turbine 46 of the gas turbine engine 20 (FIG. 1). In other examples, the static and rotating structures 102, 104 are of another engine 20 component.

The seal 100 includes one or more beams 100A and a shoe 100B with a sealing feature 100C. In the example of FIGS. 2A-B, the sealing feature 100C is sealing teeth extending towards the rotating structure 104. In the example of FIGS. 2A-B, the seal 100 includes two beams 100A, however, in other examples, the seal 100 can have more or less beams 100A.

The prior art seal 100 is a non-contact hydrostatic adaptive low-leakage seal (for example, a HALO™ seal manufactured by Advanced Technologies Group (ATGI), Stuart, Fla.). The seal 100 seals the structure 102 with respect to the structure 104 in a direction R as follows. The shoe 100B floats radially in direction R, which is perpendicular to the engine axis A. As airflow F passes by the sealing teeth 100C, a pressure gradient is formed within the sealing teeth 100C, which attempts to push or pull the shoe 100B radially in the direction R. The forces from the beams 100A also act to resist radial movement of the shoe 100B. The radial position of the shoe 100B thus changes to accommodate changes in the pressure gradient across the sealing teeth 100C until an equilibrium of forces on the shoe 100B is achieved. When an equilibrium of forces is achieved, the seal 100 maintains a constant clearance between the sealing teeth 100C and the structure 104. Accordingly, the seal 100 is adaptive to changing airflows F and seal gaps between the static and rotating structures 102, 104. This allows for maintenance of tighter clearances between static and rotating structures 102, 104.

The beams 100A, and in particular, the dual-beam design shown in FIGS. 2A-B, also keep the seal 100 aligned with other components, including the scalloped plate 108 and spacer 114 (discussed below). For example, the dual beams 100A keep the shoe 100B from rotating or pivoting with respect to other seal 100 components due to thermal expansion or contraction of the seal 100 during engine 20 operation, as compared to a single-beam design which may allow the shoe 100B to hinge about the single beam. Accordingly, the beams 100B, and in particular, the dual beam design causes the shoe 100B to move in substantially the radial direction R and not other directions.

The seal 100 is supported against a scalloped plate 108 on its downstream (low pressure) side. The relatively higher pressure of airflow F on the upstream side of the seal 100 forces the seal 100, and in particular the shoe 100B against the scalloped plate 108 in the direction P (which is parallel to the engine axis A and perpendicular to the sealing direction R). At an interface 110 of the shoe 100B and the scalloped plate 108, friction created by pressure forcing the shoe 100B in the direction P causes wear on the shoe 100B and scalloped plate 108. In particular, the seal 100 may be more prone to hysteresis effects due to dragging against the scalloped plate 108, reducing sealing effectiveness. Galling or fretting may occur on seal components, reducing life and creating foreign object debris (FOD). Furthermore, the friction resists radial movement of the shoe 100B, as discussed above.

One or more secondary seals 112 can be arranged on the upstream (high pressure) side, in one example. In the example of FIG. 2A, there are two secondary seals 112, however, in other examples, more or less secondary seals can be used. In the example with secondary seals 112, a spacer 114 is arranged between the secondary seals 112 and the shoe 100B. Also, in this example, a secondary seal cover 116 is arranged upstream of the secondary seals 112.

Turning now to FIGS. 3A-C, a seal 200 according to the present disclosure is schematically shown. The seal 200 is arranged between engine structures 102, 104. In one example, the first structure 102 is a static structure, and the second structure 104 is a rotating structure which rotates with respect to the engine axis A. A seal carrier 106 is between the structure 102 and the seal 200 and supports the seal 200.

As with seal 100, as airflow F flows between the static structure 102 and the rotating structure 104, it loses pressure. Accordingly, airflow F has a relatively higher pressure upstream from the seal 200 than it does downstream from the seal 200.

The seal 200 includes one or more beams 200A and a shoe 200B with a sealing feature 200C. In the examples of FIGS. 3A-C, the sealing feature 200C is sealing teeth extending towards the structure 104. In the example of FIGS. 3A-C, the seal 200 includes two beams 200A, however, in other examples, the seal 200 can have more or less beams 100A.

The seal 200 seals the static and rotating structures 102, 104 in the direction R as follows. The shoe 200B floats radially in direction R, which is perpendicular to the engine axis A. As airflow F passes by the sealing teeth 200C, a pressure gradient is formed within the sealing teeth 200C, which attempts to push or pull the shoe 200B radially in the direction R. The dual beams 200A act to maintain movement of the shoe 200B substantially in the radial direction R, as discussed in more detail below. The radial position of the shoe 200B thus changes to accommodate changes in the pressure gradient across the sealing teeth 200C until an equilibrium of forces on the shoe 200B is achieved. When an equilibrium of forces is achieved, the seal 200 maintains a constant clearance between the sealing teeth 200C and the structure 104. Accordingly, the seal 200 is adaptive to changing airflows F and seal gaps between the static and rotating structures 102, 104. This allows for maintenance of tighter clearances between static and rotating structures 102, 104.

The beams 200A, and in particular, the dual-beam design shown in FIGS. 3A-C, keep the seal 200 aligned with other seal 200 components, including the scalloped plate 208 and spacer 114 (discussed below). For example, the dual beams 200A keep the shoe 200B from rotating or pivoting with respect to other seal 200 components due to thermal expansion or contraction of the seal 200 during engine 20 operation, as compared to a single-beam design which may allow the shoe 200B to hinge about the single beam. Accordingly, the beams 200B, and in particular, the dual beam design, causes the shoe 200B to move in substantially the radial direction R and not other directions.

The seal 200 is supported against a scalloped plate 208 on its downstream (low pressure) side. The relatively higher pressure of airflow F on the upstream side of the seal 200 forces the seal 200, and in particular the shoe 200B against the scalloped plate 208 in the direction P (which is parallel to the engine axis A and the radial direction R). One or more bearings 209 are arranged at an interface 210 of the shoe 200B and the scalloped plate 208. In the example of FIG. 2C, two bearings 209 are at the interface 210 for each sealing shoe 200B. However, in other examples, more or less bearings could be used. The bearings 209 reduce friction between the shoe 200B and scalloped plate 208, allowing the shoe 200B to move as needed to a balanced equilibrium position, at which it provides maximum sealing effectiveness. Furthermore, reduced friction reduces wear between the shoe 200B and the scalloped plate 208.

In one example, the bearings 209 are arranged in pockets 211 formed in the scalloped plate 208. The pockets 211 maintain the bearings 209 in an axial position with respect to the engine axis A. In another example, the bearings 209 may be arranged in pockets formed in the shoe 200B instead of in the scalloped plate 208.

In one example, the bearings 209 are roller bearings, as shown in FIG. 3B. Roller bearings have rolling pins 209A which role to facilitate movement of the shoe 200B with respect to the scalloped plate 208. However, in other examples, the bearings 209 can be other types of bearings.

As above, one or more secondary seals 112 can be arranged on the upstream (high pressure) side, in one example. In the example of FIG. 3A, there are two secondary seals 112, however, in other examples, more or less secondary seals can be used. In the example with secondary seals 112, a spacer 114 is arranged between the secondary seals 112 and the shoe 200B. Also, in this example, a secondary seal cover 116 is arranged upstream of the secondary seals 112.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A seal, comprising:
   a plate;
   a floating shoe supported with respect to the plate in a first direction, the floating shoe having a sealing feature extending in a second direction perpendicular to the first direction; and
   at least one bearing between the plate and the floating shoe, the bearing configured to facilitate movement of the floating shoe with respect to the plate in the second direction, wherein the at least one bearing is in at least one of a pocket of the plate and a pocket of the floating shoe.

2. The seal of claim 1, further comprising at least one beam, the at least one beam configured to maintain movement of the floating shoe substantially in the second direction.

3. The seal of claim 2, wherein the at least one beam comprises two beams.

4. The seal of claim 1, wherein the at least one bearing is a roller bearing.

5. The seal of claim 1, wherein the sealing feature includes one or more sealing teeth.

6. A gas turbine engine, comprising:
   a first structure;
   a second structure; and
   a seal arranged between the first and second structures, the seal including a plate, a floating shoe supported with respect to the plate, the floating shoe having a sealing feature extending towards one of the first structure and the second structure; and at least one bearing between the plate and the shoe, the bearing configured to facilitate movement of the floating shoe with respect to the plate, wherein the at least one bearing is in at least one pocket in one of the plate and the floating shoe, and the at least one pocket is configured to maintain an axial position of the at least one bearing with respect to an engine axis.

7. The gas turbine engine of claim 6, wherein the plate is on a low-pressure side of the seal.

8. The gas turbine engine of claim 6, wherein the shoe floats in a radial direction with respect to an engine axis.

9. The gas turbine engine of claim 8, further comprising at least one beam, the at least one beam configured to maintain movement of the floating shoe substantially in the radial direction.

10. The gas turbine engine of claim 6, wherein the at least one bearing is a roller bearing.

11. The gas turbine engine of claim 6, wherein fluid passing between the first structure and the second structure has a higher pressure on a first side of the seal than on a second side of the seal.

12. The gas turbine engine of claim 11, wherein a pressure gradient of the fluid causes the shoe to move radially with respect to an engine axis to an equilibrium position.

13. The gas turbine engine of claim 6, wherein the first structure is a stationary structure and the second structure is a rotating structure, and wherein the sealing feature extends towards the rotating structure.

14. The gas turbine engine of claim 6, wherein the first and second structures are in one of a turbine and a compressor of the gas turbine engine.

15. A method of sealing a stationary structure with respect to a rotating structure, comprising:
   supporting a floating shoe against a plate in a first direction, the floating shoe movable with respect to the plate in a second direction perpendicular to the first direction via a bearing between the floating shoe and the plate, wherein the at least one bearing is in at least one pocket in one of the plate and the floating shoe.

16. The method of claim 15, wherein the floating shoe is movable in response to a pressure gradient of a fluid in the seal.

17. The method of claim 15, further comprising maintaining a position of the floating shoe with respect to the plate in the first direction via at least one beam.

* * * * *